United States Patent [19]

Schooley et al.

[11] Patent Number: 4,926,108

[45] Date of Patent: May 15, 1990

[54] VARIABLE SPEED/VARIABLE VOLTAGE GENERATOR SET

[76] Inventors: Arthur F. Schooley, Box 812; Wolf R. Eben-Ebenau, Box 2320, both of Slave Lake, Alberta, Canada, T0G 2A0; Lloyd J. Nelson, 9523-64 Avenue, Edmonton, Alberta, Canada, T6E 0J1

[21] Appl. No.: 145,429

[22] Filed: Jan. 19, 1988

[30] Foreign Application Priority Data

Mar. 11, 1987 [CA] Canada ................................. 531701

[51] Int. Cl.⁵ .............................................. H02P 9/04
[52] U.S. Cl. ........................................ 322/15; 322/32; 290/40 C
[58] Field of Search ..................... 322/29, 32, 14, 15, 322/38; 290/40 R, 40 C, 3; 318/140, 147

[56] References Cited

U.S. PATENT DOCUMENTS

| | | | |
|---|---|---|---|
| 3,370,218 | 2/1968 | Merz | 318/140 X |
| 3,551,685 | 12/1970 | Corry | 318/147 X |
| 3,751,192 | 8/1973 | Boyd | 417/411 |
| 4,015,187 | 3/1977 | Sasaki et al. | 322/14 |
| 4,322,630 | 3/1982 | Mezera et al. | 290/40 C |

FOREIGN PATENT DOCUMENTS 414700 8/1943 Canada .
430390 10/1945 Canada .
431807 12/1945 Canada .
444305 9/1947 Canada .

*Primary Examiner*—R. J. Hickey
*Attorney, Agent, or Firm*—Klauber & Jackson

[57] ABSTRACT

A motor-generator set for producing, within a predetermined range, a constant volts/hertz output from the generator. An engine drives an AC generator, the engine having an electronic speed regulator including a first potentiometer for adjusting a speed setting for the engine. The generator has a voltage regulator including a second potentiometer for setting the output voltage of the generator. The first and second potentiometers are ganged for simultaneous adjustment whereby adjusting the potentiometers in one direction increases the speed of the engine and the output frequency and voltage of the generator while adjusting the potentiometers in the other direction decreases the speed of the engine and the output frequency and voltage of the generator.

3 Claims, 1 Drawing Sheet

VARIABLE SPEED/VARIABLE VOLTAGE GENERATOR SET

BACKGROUND OF THE INVENTION

This invention relates to a motor-generator set for producing, within a predetermined range, a constant volts/hertz output from the generator.

Motor-generator sets are known which comprise an engine (motor), such as a diesel engine, driving an AC generator. The speed of the engine is controlled by a governor to run at a constant, but adjustable, speed so that the generator produces an output voltage at, say, 60 Hertz. A voltage regulator is normally provided to control the output voltage of the generator. When the motor-generator set is used to drive a synchronous motor, it is sometimes desirable to alter the output frequency of the generator in order to vary the speed of the synchronous motor being powered by the motor-generator set. This might be done for "soft" starting of motors or to derive increased power from the electric motor. However, if the frequency of the current provided to the motor is reduced, the applied voltage should also be reduced, because the back emf of the motor is reduced, resulting in increased current drain which could damage the motor or the generator.

Electronic controllers are known which can simultaneously alter frequency and voltage from the generator, but they are relatively complex.

U.S. Pat. No. 3,751,192 of Boyd, issued Aug. 7, 1973, discloses a generator driven by a constant torque arrangement. The generator is specially constructed to produce constant volts/hertz in operation and powers an electric motor which drives a pump. As the viscosity of the fluid being pumped decreases, the motor tends to speed up and the constant torque drive increases the speed of the generator so that its frequency and voltage increase.

SUMMARY OF THE INVENTION

The present invention provides a very simple arrangement for providing constant volts/hertz from a motor-generator set and does not require, as does U.S. Pat. No. 3,751,192, a constant torque drive or a specially constructed constant volts/-hertz generator.

The present invention provides a very simple solution whereby a motor-generator set can be modified to produce constant volts/hertz over a predetermined range, e.g. a frequency range of 40 to 75 Hertz (for a nominal 60 Hertz generator) and a voltage variation from 300 volts AC to 600 volts AC.

According to a broad aspect of the invention, there is provided a motor-generator set for producing, within a predetermined range, a constant volts/hertz output from the generator, comprising an engine driving an AC generator, said engine having an electronic speed regulator including a first potentiometer for adjusting a speed setting for the engine and said generator having a voltage regulator including a second potentiometer for setting the output voltage of the generator, said first and second potentiometers being ganged for simultaneous adjustment whereby adjusting the potentiometers in one direction increases the speed of the engine and the output frequency and voltage of the generator while adjusting the potentiometers in the other direction decreases the speed of the engine and the output frequency and voltage of the generator.

One unit according to the invention was used to power a downhole submersible oil well pump where commercial power was not available and it was advisable to test the flow and horsepower required for the well prior to ordering commercial power and permanently installed electrical equipment and pipelines. The invention has also been used to drive a fan where requirements changed depending on the weather and an injection pump where the well capabilities were less than the output capability of the pump.

The invention enables a synchronous motor to be operated at different speeds so that a nominal 60 horsepower motor can be slowed to operate at, say, 45 horsepower or speeded up to operate at, for example, 70 horsepower. The range of variation is limited to some extent by practical considerations. For example, if the output frequency is reduced too much, the diesel engine could stall and if it is increased too much, vibration could become excessive, which could damage the generator.

With the invention, there is a substantially straight 45° line relationship between voltage and frequency.

DESCRIPTION OF THE PREFERRED EMBODIMENT

Figure 1:
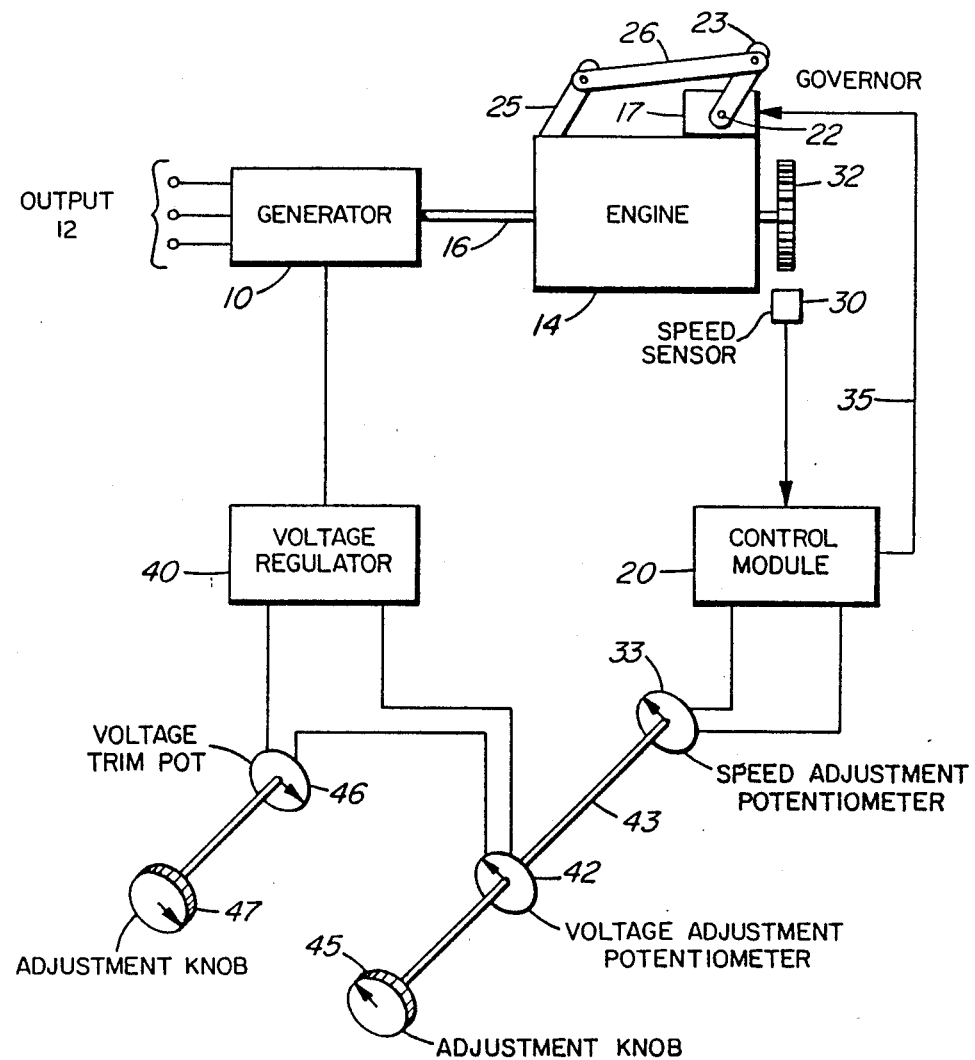
FIG. 1 is a highly schematic diagram of the arrangement according to the invention.

Referring to FIG. 1, there is shown a generator 10 having an output 12, illustrated here as a three phase output, although a single phase generator could also be used. Generator 10 is driven by an engine 14, e.g. a diesel engine, via a shaft 16 and the speed of the engine 14 is controlled by a governor which, in turn, is controlled by a control module 20. The governor 17 comprises a DC motor with an output shaft 22 provided with an arm 23. Arm 23 is connected to a lever 25 via a link 26 which controls a mechanical governor (not shown) of the engine 14 or controls the throttle setting of the engine. The control module 20 receives an input from a speed sensor 30 which may be a magnetic pickup unit which produces pulses by sensing teeth on the flywheel 32 of engine 14, although it could be arranged to sense the teeth on any other gear driven by the engine at a speed proportional to the speed of shaft 16 of the engine. A voltage derived from speed sensor 30 is compared in control module 20 with a voltage set on speed adjustment potentiometer 33 and produces an error signal on its output 35 which is applied to the governor 17 to adjust the rotational position of its shaft 22, as necessary to make the engine achieve the speed selected by the speed adjustment potentiometer 33. Any rotation of shaft 22 of governor 17 is transmitted via arm 23, link 26 and lever 25 to the governor or throttle of engine 14 to adjust its speed.

The output voltage of the generator 10 is controlled by a voltage regulator 40 which is adjustable by means of a voltage adjustment potentiometer 42. Potentiometer 42 is connected in series with a voltage trim potentiometer 46 which has an adjustment knob 47 so that the output of voltage regulator 40 can be "fine tuned". Potentiometer 46 is normally part of a standard voltage regulator 40.

It will be noted that the two potentiometers 33 and 42 are connected to a common adjustment shaft 43 having a single adjustment knob 45. Thus, turning adjustment knob 45 simultaneously adjusts potentiometers 42 and 33 and thus simultaneously adjusts the speed of the engine and the output voltage of the generator. The potentiometers 33 and 42 are selected to provide a linear relationship between the engine speed and the generator output voltage. The output frequency (hertz) of the generator 10 is directly proportional to the engine speed and thus the arrangement produces a linear relationship between hertz and voltage, i.e. constant volts/hertz output.

A suitable governor which has been used in practice is a Model 1724 governor manufactured by Woodward Governor Company of Fort Collins, Colo. United States of America. The voltage regulator may be a Basler KR4F automatic voltage regulator modified by the addition of potentiometer 42 to vary its input so that the generator output voltage can be varied, e.g. from 360 volts AC to 560 volts AC.

The control module 20 has a 24 volt D.C. power supply from the same batteries (not shown) used to start the engine, and this power is used to drive the governor motor 17 via output line 35.

We claim:

1. A motor-generator set for producing, from the generator, comprising an AC generator having a voltage regulator, an engine coupled to drive said generator and having an electrically controlled governor, an electronic speed control module, first and second potentiometers, and speed sensing means for sensing rotational speed of the engine, said first potentiometer being connected to said speed control module and said second potentiometer being connected to said voltage regulator, said speed control module comparing a voltage set by said first potentiometer with a voltage produced by said speed sensing means and providing an output voltage to said governor to set rotational speed of the engine in accordance with the setting of said first potentiometer, said second potentiometer being connected to said voltage regulator to set the output voltage of said generator in accordance with the setting of said second potentiometer, said first and second potentiometers being ganged for simultaneous adjustment whereby adjusting the potentiometers in one direction increases the speed of the engine and the output frequency and voltage of the generator while adjusting the potentiometers in the other direction decreases the speed of the engine and the output frequency and voltage of the generator.

2. A motor-generator set as claimed in claim 1 wherein said potentiometers are connected to a common control shaft having an adjustment knob.

3. A motor-generator set as claimed in claim 2 wherein said engine is a diesel engine.

* * * * *